May 3, 1938.　　　　A. F. STEIERT　　　　2,116,127
INTERMITTENT MOVEMENT FOR DISPLAY DEVICES
Filed Oct. 20, 1937　　　3 Sheets-Sheet 1

Inventor
Alois F. Steiert,
By W. W. Williamson
Attorney

May 3, 1938.  A. F. STEIERT  2,116,127
INTERMITTENT MOVEMENT FOR DISPLAY DEVICES
Filed Oct. 20, 1937  3 Sheets-Sheet 2
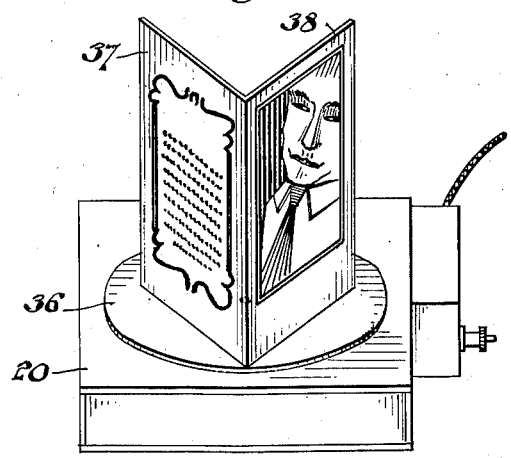
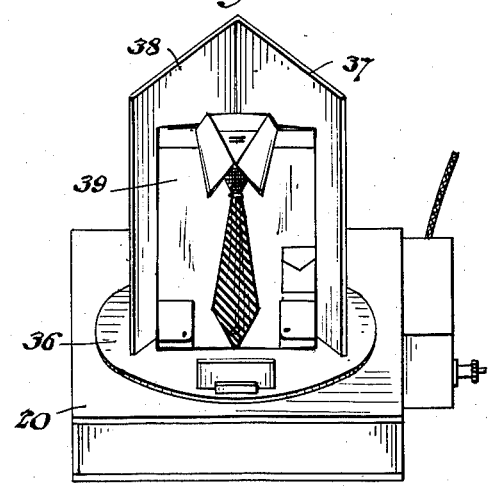
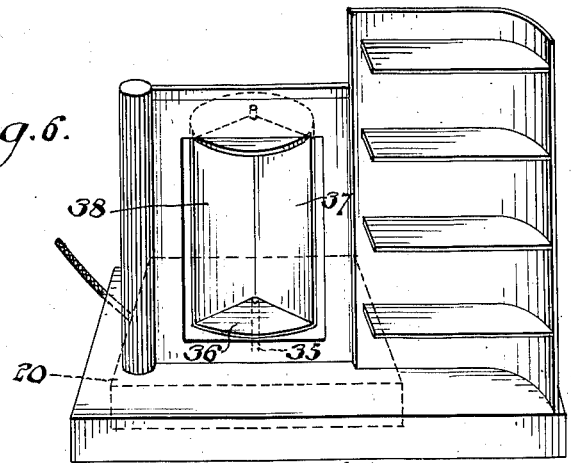
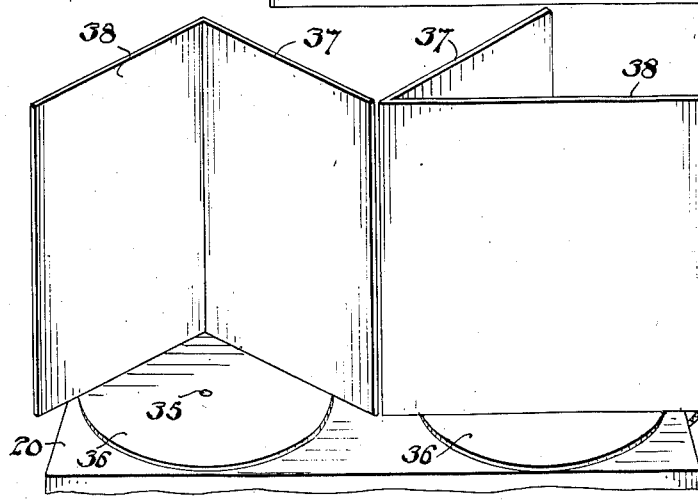
Inventor:
Alois F. Steiert,
By W. W. Williamson
Attorney.

May 3, 1938. A. F. STEIERT 2,116,127
INTERMITTENT MOVEMENT FOR DISPLAY DEVICES
Filed Oct. 20, 1937 3 Sheets-Sheet 3

Inventor.
Alois F. Steiert,
By W. B. Williamson
Attorney.

Patented May 3, 1938

2,116,127

UNITED STATES PATENT OFFICE 2,116,127

INTERMITTENT MOVEMENT FOR DISPLAY DEVICES

Alois F. Steiert, Philadelphia, Pa.

Application October 20, 1937, Serial No. 169,941

5 Claims. (Cl. 40—33)

My invention relates to a new and useful intermittent movement for display devices and has for one of its objects to provide an exceedingly simple, inexpensive device of this character which will successively and intermittently move several areas of a revolving object to a position for displaying any subject or subjects at different times.

Another object of this invention is to produce a display device that may be formed into various attractive designs having a changing display portion to arrest the attention of even casual observers to the exhibits.

Another object of the invention is to construct an intermittent movement mechanism including relatively few inexpensive elements arranged in such cooperative relation as to provide a strong and durable unitary structure.

A further object of my invention is to provide an intermittent movement mechanism consisting of a constantly revolving driving member receiving its motion through a suitable train of gears from a prime mover, such as an electric motor, said driving member overlapping at least one driven member and having a pair of radial slots extending inward from its periphery for registration with a pair of the plurality of equidistantly spaced pins or posts on the driven member, one of the slots having a finger associated therewith to engage a post for initially rotating the driven member. After the driven member is rotated a part of a revolution said member is temporarily held against rotation by coaction of the perimeter of the driving member with two adjacent posts of the driven member.

A still further object of my invention is to make a gear wheel consisting of a grooved disc and coil spring, the latter being mounted in the groove under tension so as to be held by friction against rotary movement relative to the disc under ordinary working conditions.

With the above and other objects in view, this invention consists of the details of construction and combination of elements hereinafter set forth and then designated by the claims.

In order that those skilled in the art to which this invention appertains may understand how to make and use the same, I will describe its construction, referring to the accompanying drawings forming a part hereof, in which:—

Figs. 4 and 5 are isometric views of a complete display apparatus showing the rotary parts in two different positions.

Fig. 6 is a perspective view of another arrangement of display apparatus.

Fig. 7 is a perspective view of the dual display apparatus illustrating diagrammatically how a number of sets of exhibits may be displayed relative to one another, a portion of the housing being broken away.

Figs. 8 to 12 inclusive are diagrammatic views of several positions assumed by the driving and driven members during a revolution of the driving member.

Figure 13:
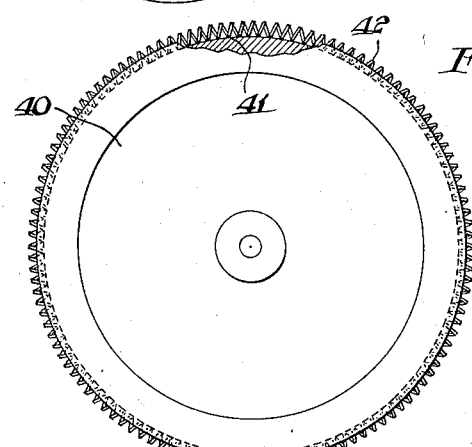

Fig. 13 is a face view of a new and special form of gear wheel with a portion of the disc or web broken away.

Figure 14:

Fig. 14 is a sectional view thereof on one of its diameters.

Figure 15:
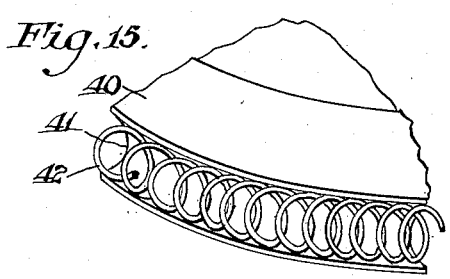

Fig. 15 is a fragmentary perspective view of the gear.

In carrying out my invention as herein embodied 20 represents any suitable frame or housing supporting the mechanism including an electric motor 21 as the prime mover on the axle 22 on which is a gear 23, such as a worm. The gear or worm 23 meshes with a gear or worm gear 24 on the shaft 25 journalled in the frame 20 and another gear or pinion 26 is mounted on the shaft 25 and meshes with the large gear 27 fixed to the shaft 28 also journalled in the frame 20. This train of gears transmits the desired motion from the prime mover to the shaft 28 for constantly revolving said shaft 28 at a proper speed and is especially illustrative of a favored arrangement but any suitable drive might be utilized.

On the shaft 28 is also fixed a driving member or disc 29 of any material but I have found a disc of fiber or composition to be exceedingly satisfactory. This driving member has a pair of radial slots 30 and 31 extending inward from its periphery and are spaced circumferentially a distance equal to two adjacent posts 32 on the driven member or members 33 so that first one and then the other of any two adjacent posts will register with the respective slots.

The posts 32 project from either face of the driven member or members 33 which are preferably in the form of discs produced from any suitable material. The driving and driven members overlap and the posts are so located that any two adjacent ones are just outside of the rim of the driving member and in fact can simultaneously engage said rim which condition will be utilized for a purpose to be presently described.

In order to cause the posts to enter the slots 30 and 31, a finger 34 is carried by the driving member with the forward edge of said finger flush with the rear edge of the slot 30 and the outer end of said finger projecting a sufficient distance beyond the periphery of the driving member to engage a post in the path of its travel.

Each driven member is fixed to a shaft 35 journalled in the frame 20 and said shaft also has a rotary member 36, which I choose to call a turntable, fixed thereon, which turntable is adapted to support display devices, exhibits, items or articles arranged in equally spaced positions so that the displayed articles will successively occupy a predetermined location on the display device which location is considered to be the front of said display device.

For purposes of illustration only I have shown the driven member or members herein as having three rotations for making a complete revolution of said driven member or members or the turntables associated therewith and the displayed articles therefore are disposed in a triangular arrangement. While a display may consist of any article or articles properly arranged, for convenience of illustration I have shown two panels 37 and 38 disposed at angles to one another forming two sides of an equilateral triangle, the third side of said triangle being represented by the imaginary line joining the spaced perpendicular edges of the panels or an article 39 occupying the space between said panels as particularly delineated in Fig. 5.

The device may be associated with any desirable ornamental objects or stationary or other display apparatus as suggested by the illustration in Fig. 6. Further the device may be positioned so that the shaft 35 of the driven member is in a vertical position, as shown, a horizontal position or any angular position relative to the vertical line.

Where two or more turntables are used the displays are arranged to cooperate in harmony. For example, referring to Fig. 7, when the open space between the panels on the left hand side, which may have an article therein, is at the front, the panel 38 on the right hand side will also be at the front but when the panel 37 on the left hand side has assumed a position at the front of the device the open space between the panels on the right hand side will also be at the front. Similarly the panel 38 on the left hand side and the panel 37 on the right hand side will be turned to the front of the device and both remain stationary at that point for a period of time.

Figure 1:
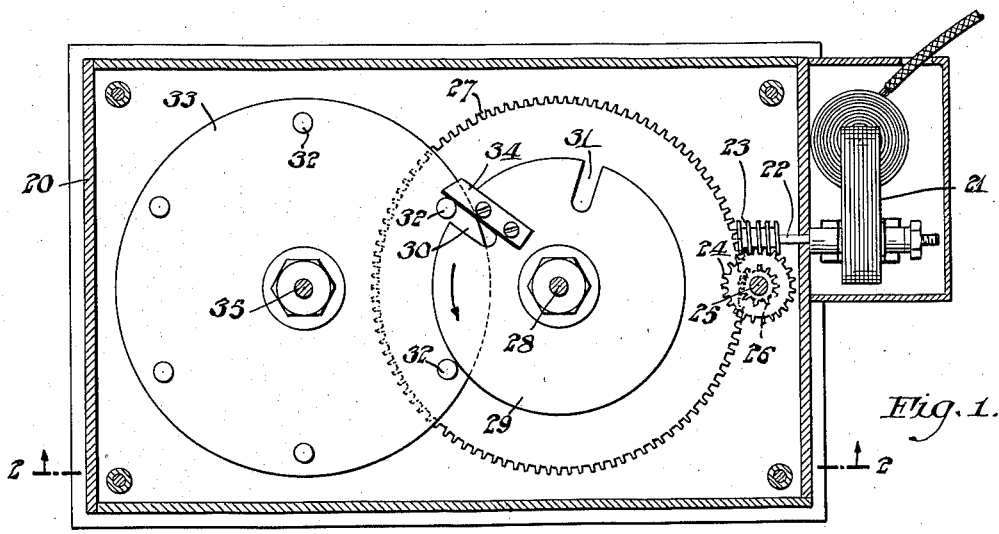
Fig. 1 is a sectional view on the line 1—1 of Fig. 2 illustrating in plan the relation of the elements of the intermittent movement mechanism.
Figure 2:
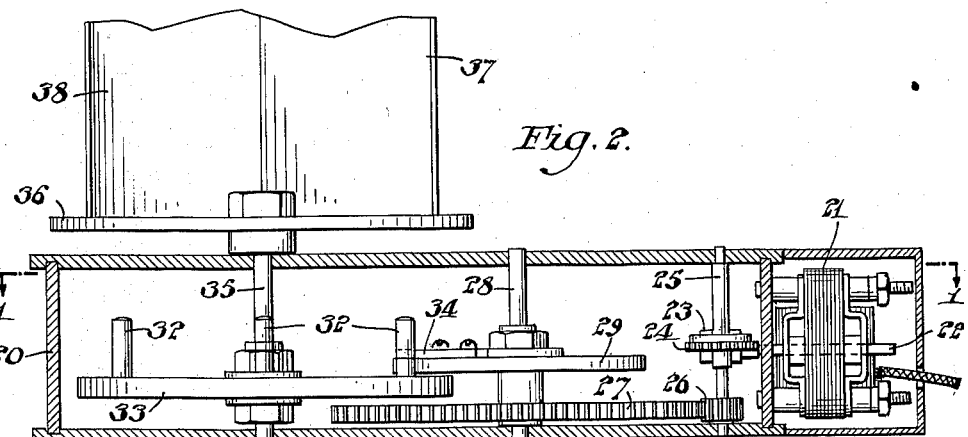
Fig. 2 is a section on the line 2—2 of Fig. 1 with the motor housing also in section.
Figure 3:
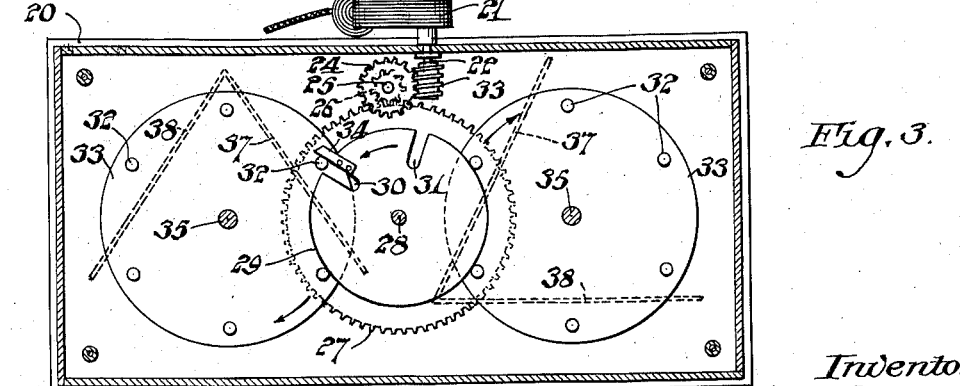
Fig. 3 is a sectional view similar to Fig. 1 on a reduced scale illustrating a duplication of the driven member.
Figure 8:
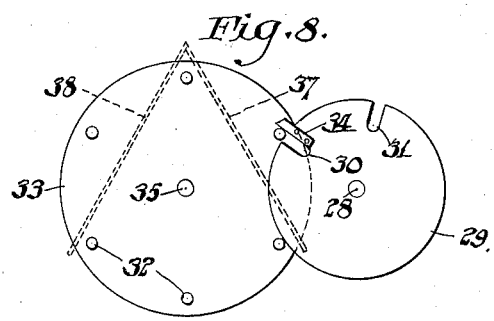
Figure 9:
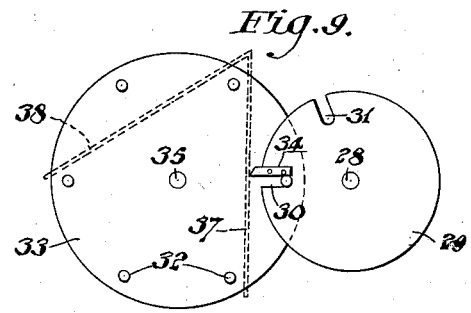
Figure 10:
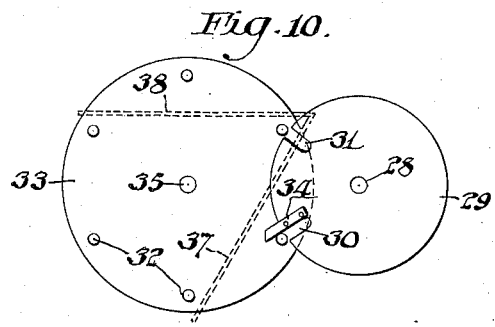
Figure 11:
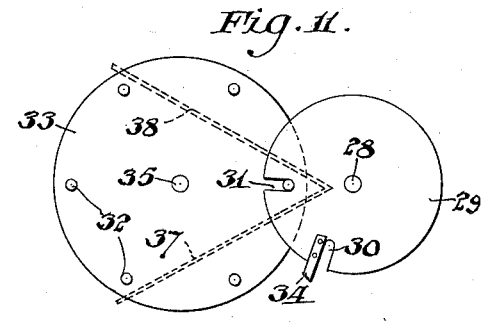
Figure 12:
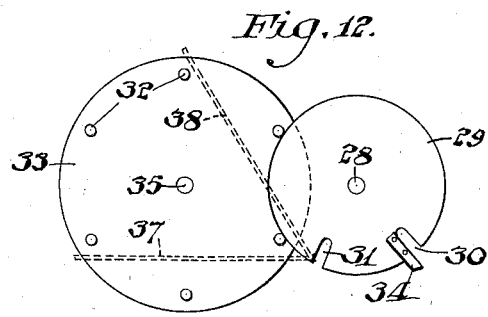

For a more complete explanation of the operation of the device reference will now be made to Figs. 8 to 12 inclusive and the space between the panels 37 and 38 is considered as being at the front of the device in Fig. 8 so that a display article or item 39 is visible to an onlooker. During a revolution of the driving member 29 the finger 34 will engage a post 32 on the driven member 33 causing the latter to rotate and the post to enter the slot 30 as shown in Fig. 9. As long as the post is in the slot 30 the driven member will be rotated by the driving member. When the members reach positions where the post leaves the slot 30 the projecting end of the finger 34 will again engage the same post and transmit a slightly further rotative motion to the driven member, Fig. 10, to cause the next succeeding post 32 to enter the slot 31 as illustrated in Fig. 11. While the second post is in the slot 31 the driving member 29 will continue to rotate the driven member 33 thereby moving the displayed articles to different positions, for example carrying the panel 37 to the front position. When the members reach positions where the second post passes from the slot 31 said second and a third post will contact the rim of the driving member, or lie in close proximity thereto, and prevent further rotation of the driven member during the balance of one revolution of the driving member so that in effect the driven member is temporarily locked against rotation. These steps are repeated at each revolution of the driving member and the driven member will be intermittently rotated for successively and repeatedly displaying the articles or items on the turntable as long as the driving member is operated.

While any suitable gearing may be used in connection with this device, I have produced a gear wheel which is exceedingly inexpensive to manufacture and having the qualities of resiliency and flexibility whereby it is capable of absorbing shocks and permitting the prime mover to continue in operation although the load may be too great to be moved.

Such a gear wheel is disclosed in Figs. 13, 14, and 15 wherein 40 is a circular frame and while, for purposes of illustration, I have shown it as a web or disc it is to be understood that I contemplate the use of spoked and other forms or constructions of frames for this purpose. In the circumference of the frame 40 is formed a groove 41 preferably, but not essentially, arcuate or substantially semi-circular in cross section. In the groove 41 is placed a coil spring 42 which is fashioned into a ring to engage the inner wall of the groove. The ends of the springs may be fastened together, for example, by welding or the ends of said spring may be fastened contiguous one another to the frame. Where the spring is made into an endless ring said ring must be of smaller diameter than the groove so as to be under tension to provide sufficient friction between the frame and spring that the latter will not move as a whole relative to the frame under ordinary conditions. Where the load is too heavy for the prime mover the spring can revolve about the frame of the gear wheel so that no damage will occur to said prime mover. Those portions of the spring coils which form the largest diameter of the gear wheel function as teeth and mesh with the teeth of a mating gear.

Of course I do not wish to be limited to the exact details of construction herein shown and described, as these may be varied within the scope of the appended claims without departing from the spirit of my invention.

Having thus described my invention, what I claim as new and useful is:—

1. In a display device, a frame, a shaft journalled in said frame, a turntable secured to said shaft for movement therewith, a driven member fixed to said shaft, a plurality of equally spaced posts on said driven member, another shaft journalled in the frame, a driving member fixed to the last named shaft and cooperating with pairs of said posts to hold the driven member stationary during a certain portion of each revolution of the driving member and said driving member having circumferentially spaced radial slots for successive registration with adjacent posts at a predetermined period in each revolution of the driving member for rotating the driven member, means carried by the driving member contiguous the rear edge of the forward slot to engage a post in the path of travel of said means to cause the posts to enter the slots, and means to revolve the last named shaft.

2. In a display device, a frame, a shaft journalled in said frame, means on said shaft to support display articles, a driven member in the form of a disc fixed to said shaft, posts projecting from a face of said driven member, another shaft journalled in said frame, a driving member in the form of a disc fixed to said other shaft and overlapping the driven member for cooperation with pairs of said posts to hold the driven member stationary during certain periods, said driving member having two circumferentially spaced radial slots extending in from its periphery for successive registration with two adjacent posts at other periods, a finger on the driving member with its forward edge flush with the rear wall of the leading slot and having its outer end projecting beyond the rim of the driving member to engage a post to cause said post to enter the lead slot and a succeeding post to enter the trailing slot as the preceding post leaves said leading slot, and means to revolve said other shaft.

3. In a device of the kind described, a frame, a shaft journalled in said frame, an electric motor mounted on said frame, a train of gears to transmit motion from the motor to said shaft for revolving the latter, a circular driving member fixed on said shaft and having a pair of circumferentially spaced radial slots extending inwardly from the periphery of said driving member, a finger mounted on said driving member with its forward edge flush with the rear edge of the lead slot and having its outer end extending beyond the edge of the driving member, another shaft journalled in the frame parallel with the first named shaft, a driven member fixed on said last named shaft, and means on said driven member to be engaged by the finger and enter the slots whereby the driven member will be intermittently rotated a part of a revolution during a predetermined portion of each revolution of the driving member, said means also adapted to engage the periphery of the driving member to hold the driven member stationary during the balance of each revolution of the driving member.

4. An intermittent movement mechanism comprising a circular revolvable driving member, a circular rotatable driven member, edges of said members overlapping, posts on one face of the driven member, the driving member having a pair of circumferentially spaced radial slots extending inward from its perimeter for registration with a pair of said posts once during each revolution of the driving member and the perimeter of said driving member coacting with two adjacent posts when the slots are not in registration with any of the posts, and means projecting from the perimeter of the driving member to contact a post to cause the two adjacent posts to enter the respective slots.

5. In combination, a driving member having a pair of radial slots extending inward from the perimeter of said member and spaced circumferentially, means to revolve said driving member, a finger projecting from the perimeter of said driving member and having its forward edge flush with the rear edge of the leading slot, a plurality of driven members the rims of which overlap the rim of the driving member, and posts on said driven members coacting with the perimeter of the driving member to hold said driven members stationary during a portion of each revolution of the driving member and two adjacent ones of said posts of each driven member being caused to enter the slots of the driving member at predetermined periods in the revolution of said driving member.

ALOIS F. STEIERT.